Patented July 7, 1953

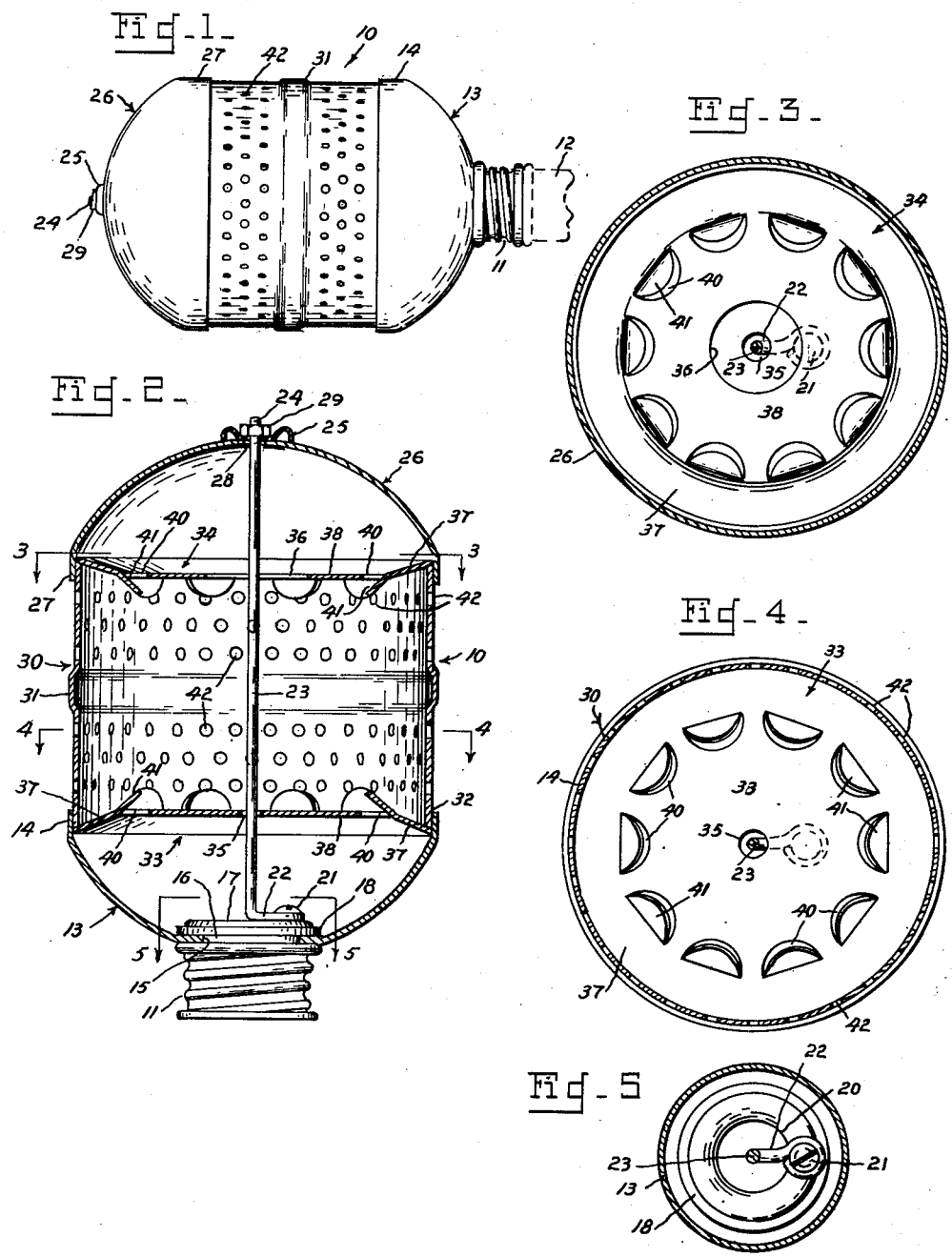

2,644,719

UNITED STATES PATENT OFFICE 2,644,719

IRRIGATOR

Harry L. Thomas, Tucson, Ariz.

Application March 19, 1951, Serial No. 216,395

10 Claims. (Cl. 299—107)

This invention relates to an irrigator and has for an object to provide an improved irrigator especially intended for delivering a large quantity of water to plants, grass, or a lawn at substantially no pressure.

It is an object of this invention to provide an irrigator useful for watering lawns and gardens, which is much faster than the usual sprinkler nozzle or filter, yet reduces the hose pressure to substantially no pressure or to such a low pressure that it eliminates soil erosion and exposed roots, and eliminates wetting the leaves of the plants which invites plant diseases.

A further object of the invention is to provide an improved irrigator which delivers a great quantity of water from the hose at little or no pressure and thus provides deep root watering of the plant or lawn.

A still further object of the invention is to provide an improved irrigator which fits all standard garden hose and is made of rust-proof materials and is substantially break-proof and fool-proof.

A further object of the invention is to provide an irrigator which will gently, fully, efficiently, safely and properly water the most delicate plants, flower beds, shrubs and new lawns preventing the washing away of the soil, with consequent erosion of the soil and damage to the plants.

A further object of the invention is to provide an improved double baffle and baffle-spacing perforated barrel whereby the water pressure of the water entering from the hose is substantially eliminated by the time the water has passed through one or both the baffles and been discharged through the perforated barrel to the area to be watered.

With the foregoing and other objects in view, as will hereinafter become apparent, this invention comprises the constructions, combinations and arrangements of parts hereinafter set forth, claimed, and illustrated on the accompanying drawing, wherein, Fig. 1 is a plan view of the irrigator of this invention in operative position.

Fig. 2 is a longitudinal sectional view.

Figs. 3, 4, and 5 are sectional views on lines 3—3 and 4—4 and 5—5 of Fig. 2.

The irrigator of this invention is an improvement over that shown in U. S. Patent 2,420,958, although generally similar to this invention.

The irrigator shown generally at 10 includes a female threaded coupling 11 made of either rust-proof brass or a moulded phenolic condensation product oftentimes commercially sold under the name Bakelite. Any conventional garden hose 12 may be secured to the coupling 11 in the usual manner. Secured to the coupling 11 is an apertured substantially semi-spherical cap 13 ending at its widest diameter in a cylindrical flange portion 14 and being apertured at 15 through which the coupling cylindrical neck 16 extends and then is spun or moulded at 17 against a rust-proof washer 18 within the cap 13 for securing the coupling 11 and cap 13 rigidly together, and providing an opening 20 through which the water may enter the irrigator tank from the hose 12. Extending through the washer 18 and aligned openings in the turned portions of the coupling neck 15 is a threaded aperture for receiving a holding screw 21 for fastening an eye end 22 of an assembly rod 23 thereto. This assembly rod 23 extends axially through the irrigator and has a threaded end 24 for cooperation with a cap washer 25 and threaded nut 29 on the outside of a second irrigator cap 26. The irrigator cap 26 is similar to the cap 13 and is provided with a cylindrical flange 27 similar to the other cap flange 14, but the center of the cap 26 is provided with a small aperture 28 just sufficient for the assembly rod 23 to pass therethrough in place of the large aperture in the other cap through which the coupling 11 is passing.

Secured between the caps 13 and 26 is a cylindrical barrel 30, the barrel 30 being provided with an imperforate slightly enlarged center annulus 31 and imperforate cylindrical ends 32 of an external diameter substantially equal to the internal diameter of the cap flange portions 14 and 27. Two similar but slightly different baffles 33 and 34 are provided, baffle 33 having a small central aperture 35 only slightly larger than the diameter of the assembly rod 23 and the other baffle 34 having a central aperture 36 substantially larger than the diameter of the assembly rod 23 and in fact having a diameter about equal to the diameter of a standard garden hose, as shown at 12. Otherwise the baffles 33 and 34 are about the same, and each includes a cone-shaped annular edge 37 whose external diameter is about equal to the external diameter of the barrel cylinder ends 32 and the internal diameter of the cap cylindrical flange portions 14 and 27. The cone portion 37 extends from a substantially annular flat plate portion 38 in the center of which is located the apertures 35 or 36. Along the joining line between the cone-shaped portion 37 and the flat plate portion 38 there are provided a plurality of struck-out crescent shaped openings 40 with the struck-out crescent shaped tab 41 extending toward the center of the irrigator 10 and being at an acute angle to the flat plate portion 38, there being approximately ten such crescent-shaped openings 40 and struck-out flanges 41 on each baffle plate 32 and 34. While of course the dimensions are no part of the invention, the over-all length of the assembled irrigator 10 is approximately 5 inches and the over-all maximum diameter is approximately 3 inches. The entire irrigator is made of rust-proof materials, such as brass, aluminum or Bakelite, the barrel cylinder 30 being of aluminum while the caps and coupling may be either brass or Bakelite. Between the imperforate center annulus 31 and the imperforate cylindrical annulus 32, the barrel cylinder 30 is provided with three staggered rows of perforations 42, through which the water finally emerges at little or no pressure from the irrigator 10. The irrigator 10 is connected to any standard garden hose 12 and laid on its side in the area which is to be watered. Water entering through the coupling 11 at hose pressure strikes the first baffle plates 33 and is deflected back to the inside of cap 13, where it is again deflected back to the outer portions of baffle plate 33, finally passing through the crescent-shaped openings 40 and deflected by the crescent tabs 41 towards the center of the irrigator. Each time the water is deflected and its direction changed it loses some of its pressure, and some of the water passing through the opening 40 may have already lost its pressure and will drop to one side of the barrel cylinder 30 as viewed in Fig. 1, and flow out gently onto the ground. The water still under pressure is divided into a plurality of streams by the openings 40 and tabs 41 of baffle plate 33 so as to strike each other along the actual center of the irrigator as represented by the assembly rod 23. Such water still under pressure will flow along this axial center through the enlarged opening 36 in baffle plate 34, strike the inside of cap 26, deflect back therealong to the inside, cone-shaped portion 37 of baffle plate 34 and through its openings 40 and against its struck-out tabs 41. The individual streams flowing out from these openings will again deflect toward the axial center of the irrigator and thus against the stream of water already flowing along the axial center coming from the openings in the first baffle 33. This will result in the elimination of practically all the water pressure, permitting the water to drop downwardly to the side of the barrel cylinder 30 and emerge through the cylinder openings 42 to the area to be watered. Obviously each change in direction of the water tends to eliminate some of the pressure, until all the pressure is finally eliminated by the final step just described, permitting the water to emerge on both sides of the irrigator onto the ground in a gently flowing high volume substantially pressureless flow, whereby the emerged water is in a position to soak quickly and deeply into the ground without causing soil erosion and a consequent expose of plant roots.

While the preferred form of this invention has been shown and described, it will be understood that this invention is not restricted to the particular details of construction and arrangement hereinbefore set forth, but that changes in such details and construction may be made within the scope of what is hereinafter claimed without departing from the spirit of this invention.

Having thus set forth and disclosed the nature of this invention, what is claimed is:

1. In an irrigating device having a hose coupling and a perforated cylindrical barrel secured thereto and provided with a closed end, a pair of baffle members mounted at the ends of the perforated cylindrical barrel, each baffle member being dished toward the center of said cylindrical barrel and provided with struck-out tongues extending toward the center of the barrel, the openings provided by said struck-out tongues being located on the axial center side of said tongues.

2. In an irrigating device having a hose coupling and a perforated cylindrical barrel secured thereto and provided with a closed end, a pair of baffle members mounted at the ends of the perforated cylindrical barrel, each baffle member being dished toward the center of said cylindrical barrel and provided with struck-out tongues extending toward the center of the barrel, the openings provided by said struck-out tongues being located on the axial center side of said tongues, said baffle plate furthermost from said hose coupling having an enlarged center aperture about the diameter of said hose coupling.

3. In an irrigating device having a hose coupling and a perforated cylindrical barrel secured thereto and provided with a closed end, a pair of baffle members mounted at the ends of the perforated cylindrical barrel, each baffle member being dished toward the center of said cylindrical barrel and provided with struck-out tongues extending toward the center of the barrel, the openings provided by said struck-out tongues being located on the axial center side of said tongues, said baffle plate furthermost from said hose coupling having an enlarged center aperture about the diameter of said hose coupling, and assembly means extending from said hose coupling to the closed end of said perforated cylindrical barrel.

4. In an irrigating device having a hose coupling and a perforated cylindrical barrel secured thereto and provided with a closed end, a pair of baffle members mounted at the ends of the perforated cylindrical barrel, each baffle member being dished toward the center of said cylindrical barrel and provided with struck-out tongues extending toward the center of the barrel, the openings provided by said struck-out tongues being located on the axial center side of said tongues, said baffle plate furthermost from said hose coupling having an enlarged center aperture about the diameter of said hose coupling, and assembly means secured to said hose coupling and to the closed end of said perforated cylindrical barrel, said assembly means extending along the axial center of said baffle plates.

5. In an irrigating device, the combination of a hose coupling, a substantially semi-spherical cap axially apertured and secured to said hose coupling with its aperture aligned with the aperture in the hose coupling, a second semi-cylindrical cap, a perforated cylindrical barrel extending between said spaced-apart caps having its ends received within the ends of said caps, a pair of baffle plates, each said baffle plate being located at each end of said cylindrical barrel within said semi-cylindrical caps, each baffle plate being dished toward the center of said barrel, and a plurality of struck-out tongues in said baffle plate extending inwardly toward the center of the barrel from said baffle member.

6. In an irrigating device, the combination of a hose coupling, a substantially semi-spherical cap axially apertured and secured to said hose coupling with its aperture aligned with the aperture in the hose coupling, a second semi-cylindrical cap, a perforated cylindrical barrel extending between said spaced-apart caps having its ends received within the cap ends, and a pair of baffle plates, said baffle plates being located at each end of said cylindrical barrel within said semi-cylindrical caps, each baffle plate having a frusto-cone-shaped outer annulus and a flat central annulus, a plurality of struck-out tongues in said baffle plates extending inwardly toward the center of the barrel from said baffle members, said frusto-cone-shaped outer annulus having its smaller diameter also extending toward the center of said barrel.

7. In an irrigating device, the combination of a hose coupling, a substantially semi-spherical cap axially apertured and secured to said hose coupling with its aperture aligned with the aperture in the hose coupling, said cap having an extending cylindrical flange at its end, a second semi-cylindrical cap also having an extending cylindrical flange, a perforated cylindrical barrel extending between said spaced-apart caps having its ends received within said cylindrical cap flanges, and a pair of baffle plates, said baffle plates being located at each end of said cylindrical barrel within said semi-cylindrical caps, each baffle plate having a frusto-cone-shaped outer annulus and a flat central annulus, a plurality of struck-out tongues in said baffle plates extending inwardly toward the center of the barrel from said baffle members, said frusto-cone-shaped outer annulus having its smaller diameter also extending toward the center of said barrel, said struck-out tongues extending from the juncture of said frusto-cone-shaped annulus and said flat annulus.

8. In an irrigating device, the combination of a hose coupling, a substantially semi-spherical cap axially apertured and secured to said hose coupling with its aperture aligned with the aperture in the hose coupling, said cap having an extending cylindrical flange at its end, a second semi-cylindrical cap also having an extending cylindrical flange, a perforated cylindrical barrel extending between said spaced-apart caps having its ends received within said cylindrical cap flanges, and a pair of baffle plates, each baffle plate having its diameter greater than the internal diameter of said cylindrical barrel and not greater than the internal diameter of said cylindrical cap flange, said baffle plates being located at each end of said cylindrical barrel within said semi-cylindrical caps, each baffle plate having a frusto-cone-shaped outer annulus and a flat central annulus, a plurality of struck-out tongues in said baffle plate extending inwardly toward the center of the barrel from said baffle members, said frusto-cone-shaped outer annulus having its smaller diameter also extending toward the center of said barrel, said struck-out tongues extending from the juncture of said frusto-cone-shaped annulus and said flat annulus, the flat annulus of said baffle furthermost from said hose coupling having an enlarged central aperture substantially equal to the opening in said hose coupling, said other baffle having a small central aperture.

9. In an irrigating device, the combination of a hose coupling, a substantially semi-spherical cap axially apertured and secured to said hose coupling with its aperture aligned with the aperture in the hose coupling, said cap having an extending cylindrical flange at its end, a second semi-cylindrical cap also having an extending cylindrical flange, a perforated cylindrical barrel extending between said spaced-apart caps having its ends received within said cylindrical cap flanges, a pair of baffle plates, each baffle plate having its diameter greater than the internal diameter of said cylindrical barrel and not greater than the internal diameter of said cylindrical cap flange, said baffle plates being located at each end of said cylindrical barrel within said semi-cylindrical caps, each baffle plate having a frusto-cone-shaped outer annulus and a flat central annulus, a plurality of struck-out tongues in said baffle plate extending inwardly toward the center of the barrel from said baffle members, said frusto-cone-shaped outer annulus having its smaller diameter also extending toward the center of said barrel, said struck-out tongues extending from the juncture of said frusto-cone-shaped annulus and said flat annulus, the flat annulus of said baffle furthermost from said hose coupling having an enlarged central aperture substantially equal to the opening in said hose coupling, said other baffle having a small central aperture, and an assembly rod extending through said axially aligned baffle plate apertures and secured to the hose coupling at one end and to the furthermost cylindrical cap at the other end.

10. In an irrigating device, the combination of a hose coupling, a substantially semi-spherical cap axially apertured and secured to said hose coupling with its aperture aligned with the aperture in the hose coupling, said cap having an extending cylindrical flange at its end, a second semi-cylindrical cap also having an extending cylindrical flange, a perforated cylindrical barrel extending between said spaced-apart caps having its ends received within said cylindrical cap flanges, a pair of baffle plates, each baffle plate having its diameter greater than the internal diameter of said cylindrical barrel and not greater than the internal diameter of said cylindrical cap flange, said baffle plates being located at each end of said cylindrical barrel within said semi-cylindrical caps, each baffle plate having a frusto-cone-shaped outer annulus and a flat central annulus, a plurality of struck-out tongues in said baffle plates extending inwardly toward the center of the barrel from said baffle members, said frusto-cone-shaped outer annulus having its smaller diameter also extending toward the center of said barrel, said struck-out tongues extending from the juncture of said frusto-cone-shaped annulus and said flat annulus, the flat annulus of said baffle furthermost from said hose coupling having an enlarged central aperture substantially equal to the opening in said hose coupling, said other baffle having a small central aperture, an assembly rod extending through said axially aligned baffle central apertures and secured to the hose coupling at one end and to the furthermost cylindrical cap at the other end, means for securing said assembly rod to said cylindrical cap comprising a cap washer, a thread on the end of said assembly rod extending through the cap, and a nut threaded on said thread on said assembly rod, and means for securing said assembly rod to said hose coupling comprising an eye formed on such end of said assembly rod and a stud screw through said eye threaded into said hose coupling.

HARRY L. THOMAS.

References Cited in the file of this patent

UNITED STATES PATENTS

| Number | Name | Date |
|---|---|---|
| 1,883,656 | Estock | Oct. 18, 1932 |
| 2,324,234 | Peters | July 13, 1943 |
| 2,420,958 | Landreth | May 20, 1947 |